US009255436B2

(12) United States Patent
Schönherr et al.

(10) Patent No.: US 9,255,436 B2
(45) Date of Patent: Feb. 9, 2016

(54) SPINDLE DRIVE FOR THE MOTORIZED ADJUSTMENT OF AN ADJUSTMENT ELEMENT OF A MOTOR VEHICLE

(75) Inventors: Marcus Schönherr, Frankfurt an der Oder (DE); Jörg Dörnen, Breckerfeld (DE); Arne Schneider, Wermelskirchen (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 681 days.

(21) Appl. No.: 13/165,393

(22) Filed: Jun. 21, 2011

(65) Prior Publication Data

US 2012/0024092 A1 Feb. 2, 2012

(30) Foreign Application Priority Data

Jun. 21, 2010 (DE) ..................... 20 2010 009 334 U

(51) Int. Cl.
*F16H 3/06* (2006.01)
*E05F 15/622* (2015.01)

(52) U.S. Cl.
CPC ......... *E05F 15/622* (2015.01); *E05Y 2900/546* (2013.01); *Y10T 74/18576* (2015.01)

(58) Field of Classification Search
USPC ............ 74/89.23, 89.24, 89.31, 89.32, 89.33; 464/44, 89, 169
See application file for complete search history.

(56) References Cited

U.S. PATENT DOCUMENTS 5,946,981 A * 9/1999 Ide et al. ..................... 74/579 R
7,665,794 B2 * 2/2010 Kachouh .................... 296/146.3
7,849,756 B2 * 12/2010 Minnig et al. ............... 74/89.26
7,900,530 B2 * 3/2011 Bochen et al. ............... 74/89.23
7,992,460 B2 * 8/2011 Bochen et al. ............. 74/424.76
8,015,890 B2 * 9/2011 Christensen et al. ........ 74/89.38
8,193,755 B2 * 6/2012 Jensen et al. .................. 318/687

(Continued)

FOREIGN PATENT DOCUMENTS

DE 1981528 10/1999
DE 19831442 1/2000

(Continued)

OTHER PUBLICATIONS

German Search Report, from German Patent Application No. 20 2010 009334.1, corresponding to U.S. Appl. No. 13/165,393, dated Aug. 12, 2010, pp. 1-4.

*Primary Examiner* — William Kelleher
*Assistant Examiner* — Zakaria Elahmadi
(74) *Attorney, Agent, or Firm* — Pauly, Devries Smith & Deffner, LLC

(57) ABSTRACT

Described herein is a spindle drive for the motorized adjustment of an adjustment element of a motor vehicle comprising a drive portion on the spindle side and a drive portion on the spindle nut side, in which the drive portions are able to be adjusted relative to one another in a linear manner for producing drive movements between a refracted position and an extended position and in each case comprising a coupling means for transferring the drive movements and a spring arrangement provided which pretensions the two drive portions in the extended position, wherein a predetermined rupture point is provided in the drive train of the spindle drive which fractures at a predetermined critical load acting via the coupling means on the spindle drive, and which is located outside the flux of force of the spring arrangement.

20 Claims, 2 Drawing Sheets

(56) References Cited

U.S. PATENT DOCUMENTS

| | | | | |
|---|---|---|---|---|
| 8,237,317 | B2 * | 8/2012 | Bochen et al. | 310/66 |
| 8,286,518 | B2 * | 10/2012 | Bochen | 74/89.23 |
| 8,302,227 | B2 * | 11/2012 | Jensen | 5/616 |
| 8,393,237 | B2 * | 3/2013 | Arenz et al. | 74/89.23 |
| 2005/0103137 | A1 * | 5/2005 | Chang et al. | 74/89.26 |
| 2005/0160846 | A1 * | 7/2005 | Chiang | 74/89.35 |
| 2005/0268736 | A1 * | 12/2005 | Gaechter | 74/89.23 |
| 2007/0062119 | A1 * | 3/2007 | Ritter | 49/343 |
| 2007/0137331 | A1 * | 6/2007 | Kachouh | 74/89.23 |
| 2008/0271552 | A1 * | 11/2008 | Arenz et al. | 74/89.23 |
| 2009/0133519 | A1 * | 5/2009 | Lorenzen | 74/89.32 |
| 2010/0071490 | A1 * | 3/2010 | Charuel et al. | 74/89.35 |
| 2010/0186528 | A1 * | 7/2010 | Hillen et al. | 74/89.23 |
| 2011/0271595 | A1 * | 11/2011 | Eggeling et al. | 49/358 |
| 2011/0290050 | A1 * | 12/2011 | Kummer et al. | 74/89.37 |
| 2012/0222510 | A1 * | 9/2012 | Winther et al. | 74/89.23 |

FOREIGN PATENT DOCUMENTS

| | | |
|---|---|---|
| DE | 202008016615 U1 | 4/2010 |
| EP | 1862628 | 12/2007 |

* cited by examiner

SPINDLE DRIVE FOR THE MOTORIZED ADJUSTMENT OF AN ADJUSTMENT ELEMENT OF A MOTOR VEHICLE

CROSS-REFERENCE TO RELATED APPLICATIONS

This application claims priority under 35 U.S.C. 119 to German Utility Model Application No. 20 2010 009 334.1, filed Jun. 21, 2010 in the name of Brose Schließsysteme GmbH & Co. KG, the disclosure of which is incorporated by reference herein in its entirety.

FIELD OF THE INVENTION

The present invention relates to a spindle drive for the motorized adjustment of a motor vehicle. The spindle drive in question may be used for all possible adjustment elements of a motor vehicle. Examples of this are a tailgate, a boot lid, an engine bonnet, a side door, a luggage compartment flap, a raisable roof or the like of a motor vehicle.

BACKGROUND

A known spindle drive (DE 20 2008 016 615 U1) on which the invention is based is generally provided with a feed gear mechanism consisting of a spindle and spindle nut, a drive motor being associated with the spindle nut.

Overall, the spindle drive is divided into a drive portion on the spindle side and a drive portion on the spindle nut side. The drive portion on the spindle side carries the drive motor. Actuation of the drive motor leads to a linear, relative adjustment of the two drive portions to one another. In this case, tubular housing parts, which interlock in a telescopic manner, are associated with the two drive portions.

For the coupling to the adjustment element, on the one hand, and the bodywork of the motor vehicle, on the other hand, in each case a ball cup is associated with the two drive portions, which in each case cooperate with a ball arranged on the adjustment element and, together with the respective ball, form a coupling means. In this case, the ball cup of the drive portion on the spindle nut side is connected to the spindle nut via a connecting tube.

It is particularly advantageous in the known spindle drive that a spring arrangement is provided between the two drive portions which pretensions the two drive portions in the extended position. Thus a compensation for the weight of the adjustment element may be achieved in an elegant manner.

The pretensioning force of the spring arrangement may, for example, be approximately 1000 N. For security, the drive train associated with the spring portion is generally designed so that it may withstand a tensile force of at least 5000 N. This represents a specific requirement for the structural design, as the corresponding part of the drive train generally contains force-transmitting stamped connections or the like, which lead per se to a certain weakness of the drive train.

In some cases, even the aforementioned 5000 N are not sufficient in order to prevent the spindle drive from violently falling apart. This is the case, for example, if the adjustment element is accelerated manually in an extreme manner, so that an extreme tensile load acts on the spindle drive on both ball cups. The spring arrangement, as a result, is released abruptly. The resulting complete relaxation of the spring arrangement also takes place abruptly, as a result of the extreme pretensioning, and is associated with a considerable risk of injury to the user. Therefore, it has already been proposed to design the part of the drive train associated with the spring arrangement to be even stronger, which however is associated with considerable additional costs.

SUMMARY OF THE INVENTION

The object of the invention is to design and develop the known spindle drive such that the security against undesired relaxation of the spring arrangement is increased by simple means.

The above problem is achieved in a spindle drive for the motorized adjustment of an adjustment element of a motor vehicle having a drive portion on the spindle side and a drive portion on the spindle nut side in which the drive portions are able to be adjusted relative to one another in a linear manner for producing drive movements between a retracted position and an extended position and in each case comprising a coupling means for redirecting or transferring the drive movements and a spring arrangement which pretensions the two drive portions in the extended position. In one embodiment, the drive train of the spindle drive includes a predetermined rupture point which fractures at a predetermined critical load acting via the coupling means on the spindle drive, and which is located outside the flux of force of the spring arrangement. In one embodiment, the critical load is a predetermined critical tensile load acting via the coupling means on the spindle drive in the direction of the extended position.

In one embodiment, the drive train of the spindle drive includes a predetermined rupture point, in order to avoid complete relaxation of the spring arrangement which is caused by fracture, even with incorrect operation in the event of extreme actuating forces. In this case it is essential that the predetermined rupture point fractures at a predetermined critical load acting via the coupling means on the spindle drive, so that the drive train is correspondingly disconnected. In this case, the predetermined rupture point is located outside the flux of force of the spring arrangement. This means that the flux of force of the pretensioning force produced by the spring arrangement never extends over the predetermined rupture point. Accordingly, the fracture of the predetermined rupture point does not result in the spring arrangement being abruptly released or being abruptly relaxed in a dangerous manner for the user. Instead, fracture at the predetermined rupture point allows release of tensile loads in the spindle drive, while allowing the spring arrangement to remain intact. This controlled fracturing or breaking provides significant safety improvements over prior spindle drive configurations.

The incorporation of a proposed predetermined rupture point requires practically no additional cost relative to the known spindle drive, so that the proposed solution may be implemented cost-effectively.

In order to permit the fracture of the predetermined rupture point to take place in a defined manner, the predetermined rupture point, with regard to a tensile load, is designed to be weaker by at least 10%, preferably at least 15%, than all remaining components of the drive train of the spindle drive. Note that drive train, as used herein, includes not just those portions of the spindle drive that create force, but those that transfer force or are otherwise associated with coupling the spindle drive to a vehicle. It is preferably provided that the predetermined rupture point is designed to be at least 10% weaker with regard to a tensile load than all remaining components of the drive train of the spindle drive. This means that the predetermined rupture point fractures at a tensile load which is at least 10% less than the tensile load theoretically required for fracturing the remaining components of the drive train. The term "theoretically" is in this case correct, as in the above design, in practice, the predetermined rupture point fractures before any other components of the drive train can fracture.

In one embodiment, the two drive portions in each case have a substantially tubular housing part, and the two housing parts substantially interlock in a telescopic manner, preferably so that the predetermined rupture point is arranged inside the housing part of the respective drive portion.

In one embodiment, the two coupling means are aligned relative to the longitudinal axis of the spindle of the spindle drive, preferably so that one of the coupling means is connected via a connecting tube to the spindle nut.

In one embodiment, the predetermined rupture point is substantially subjected to tensile loads acting exclusively on the spindle drive. Thus the fracture behaviour of the predetermined rupture point may be adjusted quite accurately as, in particular, torsional or bending loads do not affect the fracture behaviour of the predetermined rupture point.

In another embodiment, the spindle drive includes a coupling means having a guide pin, which is received in a guide sleeve of the associated drive portion, and the predetermined rupture point is implemented by a weakening of the guide pin.

In another embodiment, the guide pin is aligned parallel to the linear drive movement.

In another embodiment, the weakening of the guide pin is implemented by a narrowing or the like.

In another embodiment, the weakening of the guide pin is implemented by a peripheral groove in the guide pin, preferably that the groove viewed in cross section is designed to be trough-shaped with rounded edges in the bottom of the groove, further preferably that the radii of the rounded edges are at least 5%, in particular at least 10%, of the width and/or the depth of the groove or that the groove viewed in cross section is rounded overall, in particular of circular or elliptical design.

In another embodiment, the weakening of the guide pin viewed along its longitudinal axis is located inside the guide sleeve, in particular approximately in the middle of the guide sleeve.

In another embodiment, a positive connection element, in particular a projection, a circlip or the like is associated at one end with the guide pin, which provides a support relative to the guide sleeve for absorbing tensile loads.

In another embodiment, a positive connection element, in particular a projection, a circlip or the like is associated with the guide pin at the other end, which provides a support relative to the guide sleeve for absorbing compressive loads, preferably that the guide pin is positively engaged with the guide sleeve between the two positive connection elements.

In another embodiment, the guide pin is rotatably guided in the guide sleeve.

In another embodiment, the two coupling means in each case provide a ball-ball cup coupling, and preferably that the guide pin, together with the associated ball and/or ball cup, is designed as an integral component.

In this case it is essential that a coupling means has a guide pin which is received in a guide sleeve of the associated drive portion and which has a weakening for implementing the predetermined rupture point. In particular, the arrangement of the weakening of the guide pin inside the guide sleeve ensures predefined conditions when loading the predetermined rupture point. This, in turn, ensures a high reproducibility of the fracture behaviour of the predetermined rupture point.

BRIEF DESCRIPTION OF THE FIGURES

The invention is described in more detail hereinafter, with reference to an exemplary embodiment. In the drawings.

DETAILED DESCRIPTION OF THE INVENTION

The proposed spindle drive 1 may be used for all possible adjustment elements of a motor vehicle. Examples of this have been provided in the introductory part of the description.

The spindle drive 1 is described hereinafter exclusively in connection with the motorized adjustment of a tailgate 2 of a motor vehicle. This is understood to be advantageous, but not restrictive. All explanations regarding a tailgate 2 of a motor vehicle also apply fully to all adjustment elements in question.

Figure 1:
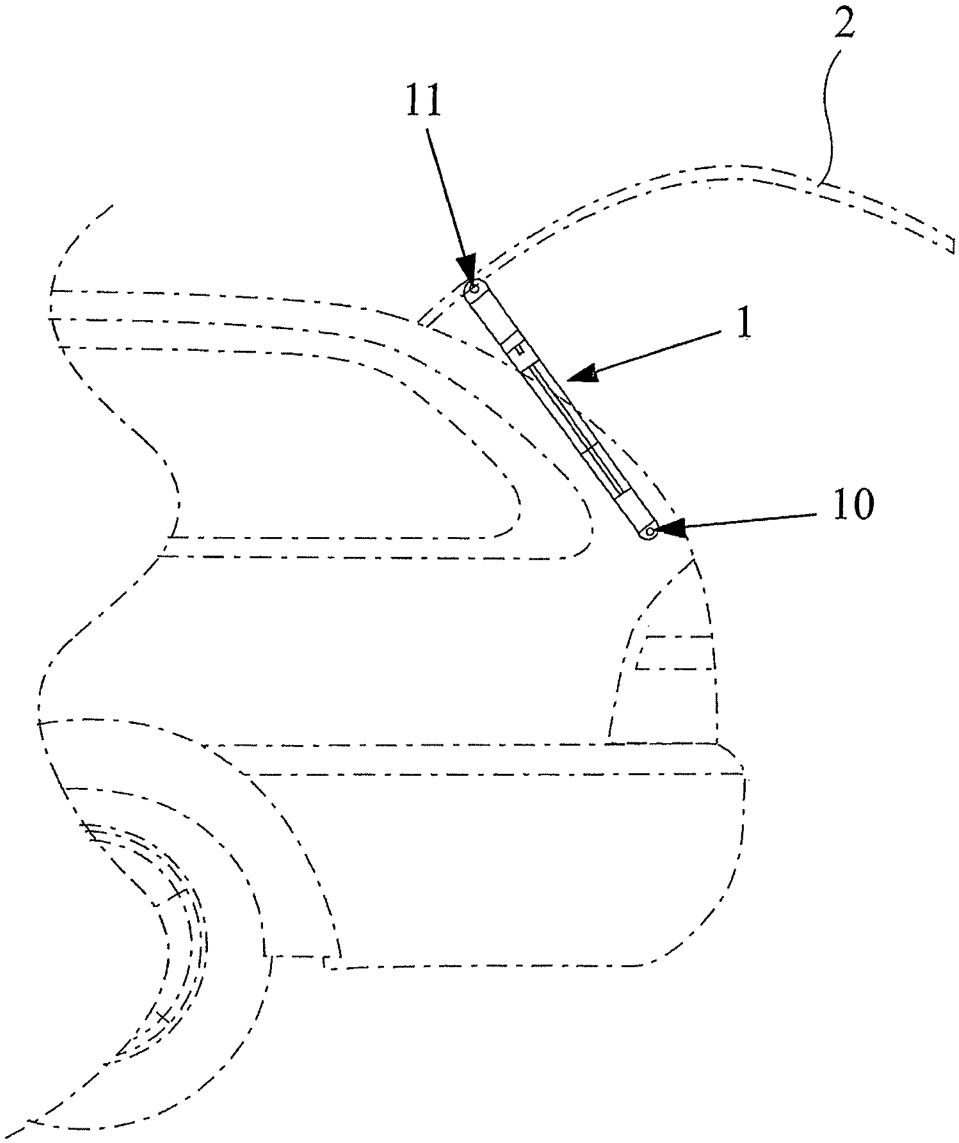
FIG. 1 shows, in a schematic side view, the rear region of a motor vehicle comprising a tailgate, with which a spindle drive according to the proposal is associated.

In the side view of the rear region of the motor vehicle according to FIG. 1, only a single spindle drive 1 may be seen. Actually, it is provided here that in each case a spindle drive 1 is arranged on both sides of the tailgate 2. Even this is understood not to be restrictive.

Figure 2:
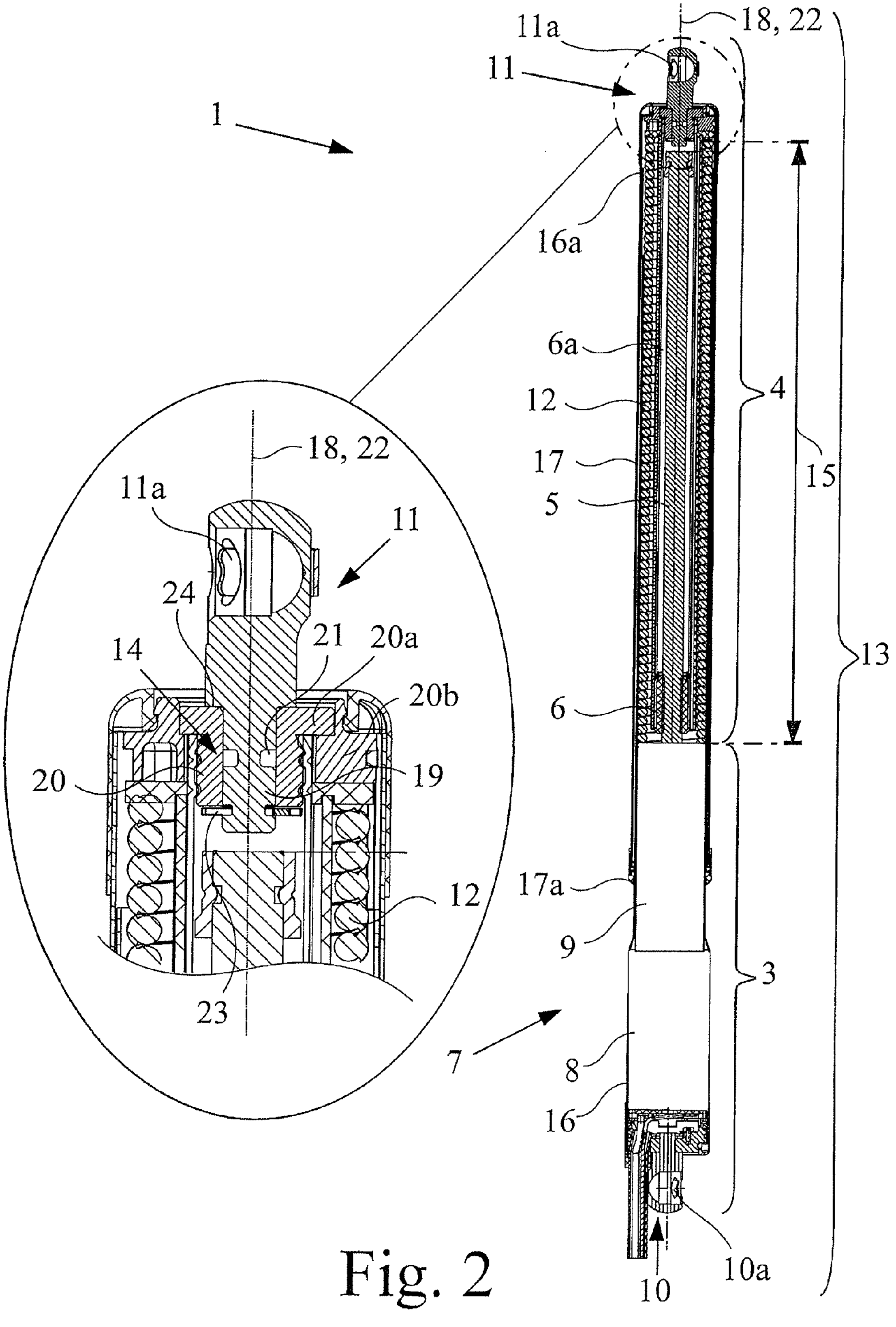
FIG. 2 shows the drive according to FIG. 1 in a sectional side view.

It may be derived from the view according to FIG. 2 that the spindle drive 1 has a drive portion 3 on the spindle side and a drive portion 4 on the spindle nut side, which are coupled together in terms of drive technology via the engagement between the spindle 5 and the spindle nut 6. The spindle 5 is in this case coupled to a drive unit 7 consisting of a drive motor 8 and gear mechanism 9. For producing drive movements, the spindle 5 is rotated in a motorized manner, whereby the drive portions 3, 4 are able to be adjusted relative to one another in a linear manner between a refracted position and an extended position shown in FIG. 2. The two drive portions 3, 4 have in each case a coupling means 10, 11 for transferring the drive movements (such as to the tailgate and body of the vehicle). In this case, and preferably, the coupling means 10, 11 are used for coupling to the tailgate 2, on the one hand, and to the bodywork of the motor vehicle, on the other hand.

The spindle drive 1 shown in FIG. 2 also has a spring arrangement 12 which forces apart the two drive portions 3, 4, i.e. pretensions the two drive portions in the extended position. For better understanding, reference should firstly be made to the fact that the coupling means 11, associated with the drive portion 3 on the spindle nut side, is connected to the spindle nut 6 via a connecting tube 6*a*.

In the drive train 13 of the spindle drive 1, a predetermined rupture point 14 is now provided which fractures at a predetermined critical load acting via the coupling means 10, 11 on the spindle drive 1. In this case it is essential that the predetermined rupture point 14 is arranged so that it is always located outside the flux of force of the spring arrangement 12. The flux of force of the spring arrangement 12 is schematically shown in FIG. 2 by an arrow with the reference numeral "15".

It is interesting in the proposed solution, as explained in the general part of the description, that a fracture of the predetermined rupture point 14 namely leads to tearing of the coupling means 11 associated with the drive portion 4 on the spindle nut side. Forcing apart the entire spindle drive 1 with an abrupt, complete relaxation of the spring arrangement 12 is never, however, associated with the fracture of the predetermined rupture point 14. Risk to the user, for example by manually opening the tailgate 2 with extreme manual actuating force, thus does not lead to a risk of injury for the user.

The predetermined rupture point 14 may be designed for different types of loads. In this case, and preferably, the critical load is a predetermined critical tensile load in the direction of the extended position acting on the spindle drive 1 via the coupling means 10, 11.

In order to be able to ensure the fracture of the predetermined rupture point in a manner which is as reproducible as possible, it is preferably provided that, with regard to the above tensile load, the predetermined rupture point 14 is designed to be weaker by at least 10% than all remaining components of the drive train 13 of the spindle drive 1. This means inevitably that, in the case of an excessive tensile load, only the predetermined rupture point 14 fractures. In order to increase the reproducibility further, it is further preferably provided that the predetermined rupture point 14 is even designed to be at least 15% weaker than all remaining components of the drive train 13 of the spindle drive 1.

The structural design shown in FIG. 2 of a spindle drive 1 may be quite particularly easily used for the proposed solution. In this case, the two drive portions 4, 5 in each case have a substantially tubular housing part 16, 17, which interlock in a substantially telescopic manner. The housing parts 16, 17 in each case start at the associated coupling means 10, 11 and in each case extend as far as a corresponding housing end piece 16*a*, 17*a*.

In principle, the predetermined rupture point 14 may be designed separately from the housing parts 16, 17. It is conceivable, for example, that the predetermined rupture point 14 is arranged on a part of the coupling means 10, 11 associated with the tailgate 2. In this case, however, it is preferable that the predetermined rupture point 14 is arranged inside the housing part 16, 17 of the respective drive portion 3, 4, in this case the housing part 17 of the portion 4 on the spindle nut side. Thus, the reproducibility of the fracture behaviour may be implemented in a particularly simple manner, as explained further below.

A particularly compact design results from the spindle drive 1 shown in FIG. 2, by the two coupling means 10, 11 being aligned relative to the longitudinal axis 18 of the spindle 5 of the spindle drive 1, as already indicated, preferably one of the coupling means 10, 11 being connected via a connecting tube 6*a* to the spindle nut 6. It may be revealed from the detailed view of FIG. 2 that the arrangement here is such that the predetermined rupture point 14 is substantially subjected to tensile loads acting exclusively on the spindle drive 1 and is not subjected to any compressive, torsional or bending loads acting from outside on the drive train. Depending on which forces act from outside on the spindle drive 1, the predetermined rupture point 14 is also substantially exclusively subjected to the above tensile loads. By “substantially” is understood here that minimum compressive, torsional or bending loads may occur which, however, are not essential for the fracture behaviour of the predetermined rupture point 14. How this is preferably implemented is able to be derived from the following embodiments.

In the first instance, it is the case that the coupling means 11 associated with the drive portion 4 on the spindle nut side has a guide pin 19 which is received in a guide sleeve 20 of the drive portion 4 on the spindle nut side. The predetermined rupture point 14 is in this case implemented by a weakening 21 of the guide pin 19. This provides an easily implemented predetermined rupture point 14.

For clarification, reference should be made here to the fact that the guide sleeve 20 is stamped with the connecting tube 6*a*. Moreover, the guide sleeve 20 is engaged via a collar 20*a* with a cover 20*b*, which in turn is stamped with the housing part 17.

The guide pin 19 is aligned in this case, and preferably, parallel to the linear drive movement (from top to bottom in the figure). Thus the design of the predetermined rupture point 14 may be implemented in the simplest possible manner with regard to the aforementioned tensile load.

The weakening 21 of the guide pin 19 may preferably be implemented by a narrowing or the like. In this example embodiment, the weakening 21 is a peripheral groove in the guide pin 19. With the design of the weakening 21, in this case the groove 21, the fracture behaviour of the predetermined rupture point 14 may be set. Thus, the aforementioned reproducibility of the fracture behaviour has particular significance.

In a particularly preferred embodiment, the groove 21 is designed so that, viewed in cross section, it has no pronounced edges. Thus notch effects which would lead to a less deterministic fracture behaviour of the predetermined rupture point 14 are substantially avoided. Preferably the groove 21 viewed in cross section is trough-shaped with rounded edges in the bottom of the groove, the radii of the rounded edges further preferably being at least 5%, in particular at least 10%, of the width and/or the depth of the groove 21. Advantageously, the groove 21, viewed in cross section, is designed to be rounded overall, in particular circular or elliptical. In all the above advantageous variants for the groove 21, it is not necessary that the groove 21 viewed in cross section is of symmetrical design.

A further possibility for adjusting the fracture behaviour is in the specific adjustment of the surface roughness in the region of the weakening 21, in this case the groove 21. In particular, it may be provided to reduce the surface roughness in the region of the narrowing 21 and/or the groove 21, in order to improve the reproducibility of the fracture behaviour of the predetermined rupture point 13. This may, for example, be effected by the region of the weakening 21 and/or the groove 21 being polished, ground or the like.

It is interesting in the exemplary embodiment which is shown, and is preferable in this regard, that the weakening 21 of the guide pin 19 viewed along its longitudinal axis 22 is located inside the guide sleeve 20, in this case even approximately in the middle of the guide sleeve 20. Thus it is ensured that the predetermined rupture point 14 is to a certain extent shielded by the guide sleeve 20 from bending loads. The guide sleeve 20 is accordingly a stable component made of steel or the like, so that the above shielding of the predetermined rupture point 14 is ensured.

It is interesting in the exemplary embodiment shown further in FIG. 2 that at one end a positive connection element 23, in this case a circlip 21, is associated with the guide pin 19, which element provides a support relative to the guide sleeve 20 for absorbing the above tensile loads. Instead of the circlip 21, a different type of projection or the like may also be provided. Due to the aforementioned structural design of the spindle drive 1 it is thereby clarified that the predetermined rupture point 14 in any case is located outside the flux of force of the spring arrangement 12.

For absorbing compressive loads, at the other end a further positive connection element 24, in this case a projection 24 integral with the guide pin 19, is associated with the guide pin 19, which in turn provides a support relative to the guide sleeve 20. In principle, this positive connection element 24 may also be a circlip or the like.

In the above-mentioned support of the guide pin 19 on both sides, compressive loads are completely absorbed by the upper projection 24 in FIG. 2. Thus the predetermined rupture point 14 is also shielded from compressive loads in the above sense.

Finally, it is of particular significance that the guide pin 19 in this case, and preferably, is rotatably guided in the guide sleeve 20. Thus the predetermined rupture point 14 is accordingly free from any torsional loads.

As a result, by the embodiment which is shown in FIG. 2 and preferred in this regard, it may be ensured that only the aforementioned tensile loads act on the predetermined rupture point 14, which is associated with a particularly high reproducibility of the fracture behaviour of the predetermined rupture point 14.

For the design of the coupling means 10, 11, numerous variants are conceivable. In this case, and preferably, the two coupling means 10, 11 in each case provide a ball-ball cup coupling between the spindle drive 1 and the tailgate 2 and/or the motor vehicle bodywork. Furthermore, in this case and preferably, the guide pin 19 together with the associated ball cup 11*a* is designed as an integral component.

In the preferred exemplary embodiment according to FIG. 2, the ball cups 10*a*, 11*a* cooperate with balls, not shown, which in each case are arranged on the tailgate and/or on the bodywork of the motor vehicle. In principle, in this case it may also be provided that the predetermined rupture point 14 is arranged on the part of the coupling means 10, 11 associated with the one of the balls.

What is claimed is:

1. A spindle drive for the motorized adjustment of an adjustment element of a motor vehicle, the spindle drive comprising:

- a first drive portion on a spindle side and a second drive portion on a spindle nut side of the spindled drive, in which the drive portions are able to be adjusted relative to one another in a linear manner for producing drive movements between a retracted position and an extended position; and
- a spring arrangement which pretensions the two drive portions in the extended position;
- wherein a predetermined rupture point is provided in the spindle drive, the predetermined rupture point configured to fracture at a predetermined critical load, wherein the adjustment element is manually adjustable, wherein the critical load is a predetermined critical tensile load acting via the coupling means on the spindle drive in the direction of the extended position, wherein the predetermined critical tensile load is less than a tensile load at which any other of the remaining components of the drive train of the spindle drive fractures, and wherein the predetermined rupture point is located outside of the flux of force of the spring arrangement, such that the flux of force of the pretensioning force produced by the spring arrangement never extends over the predetermined rupture point.

2. The spindle drive according to claim 1, wherein the critical load is a predetermined critical tensile load acting via the coupling means on the spindle drive in the direction of the extended position.

3. The spindle drive according to claim 2, wherein the predetermined critical tensile load is less by at least 10% than a tensile load at which any other of the remaining components of the drive train of the spindle drive fractures.

4. The spindle drive according to claim 1, wherein the two drive portions in each case have a substantially tubular housing part, and the two housing parts substantially interlock in a telescopic manner.

5. The spindle drive according to claim 4, wherein the predetermined rupture point is arranged inside the housing part of the respective drive portion.

6. The spindle drive according to claim 1, wherein the two coupling means are aligned relative to the longitudinal axis of the spindle of the spindle drive.

7. The spindle drive according to claim 5, wherein one of the coupling means is connected via a connecting tube to the spindle nut.

8. The spindle drive according to claim 1, wherein the arrangement is such that the predetermined rupture point is substantially subjected to tensile loads acting exclusively on the spindle drive.

9. The spindle drive according to claim 1, wherein a coupling means has a guide pin, which is received in a guide sleeve of the associated drive portion, and that the predetermined rupture point is implemented by a weakening of the guide pin.

10. The spindle drive according to claim 9, wherein the guide pin is aligned parallel to the linear drive movement.

11. The spindle drive according to claim 9, wherein the weakening of the guide pin is implemented by a narrowing.

12. The spindle drive according to claim 1, wherein the weakening of the guide pin is implemented by a peripheral groove in the guide pin.

13. The spindle drive according to claim 10, wherein the groove viewed in cross section is designed to be trough-shaped with rounded edges in the bottom of the groove.

14. The spindle drive according to claim 11, wherein (1) the radii of the rounded edges are at least 5% of the width and/or the depth of the groove, or (2) the groove viewed in cross section is rounded overall.

15. The spindle drive according to claim 9, wherein the weakening of the guide pin viewed along its longitudinal axis is located inside the guide sleeve.

16. The spindle drive according to claim 9, wherein at one end a positive connection element is associated with the guide pin, which provides a support relative to the guide sleeve for absorbing tensile loads.

17. The spindle drive according to claim 16, wherein at the other end a positive connection element is associated with the guide pin, which provides a support relative to the guide sleeve for absorbing compressive loads.

18. The spindle drive according to claim 9, wherein the guide pin is rotatably guided in the guide sleeve.

19. The spindle drive according to claim 1, wherein the two coupling means in each case provide a ball-ball cup coupling.

20. A spindle drive for the motorized adjustment of an adjustment element of a motor vehicle, the spindle drive comprising:

- a first drive portion on the spindle side and a second drive portion on the spindle nut side, in which the first and second drive portions are able to be adjusted relative to one another in a linear manner for producing drive movements between a retracted position and an extended position;
- a coupling means for transferring the drive movements of the first and second drive portions; and
- a spring arrangement which pretensions the first and second drive portions in the extended position;
- wherein the spindle drive fractures at a predetermined critical load applied to the coupling means, wherein the adjustment element is manually adjustable, wherein the critical load is a predetermined critical tensile load acting via the coupling means on the spindle drive in the direction of the extended position, wherein the predetermined critical tensile load is less than a tensile load at which any other of the remaining components of the drive train of the spindle drive fractures, and wherein the predetermined rupture point is located outside of the flux of force of the spring arrangement, such that the flux of force of the pretensioning force produced by the spring arrangement never extends over the predetermined rupture point.

* * * * *